Nov. 28, 1933.　　　M. L. BRADY　　　1,937,262
ANIMAL TRAP
Filed Jan. 3, 1933　　　2 Sheets-Sheet 1
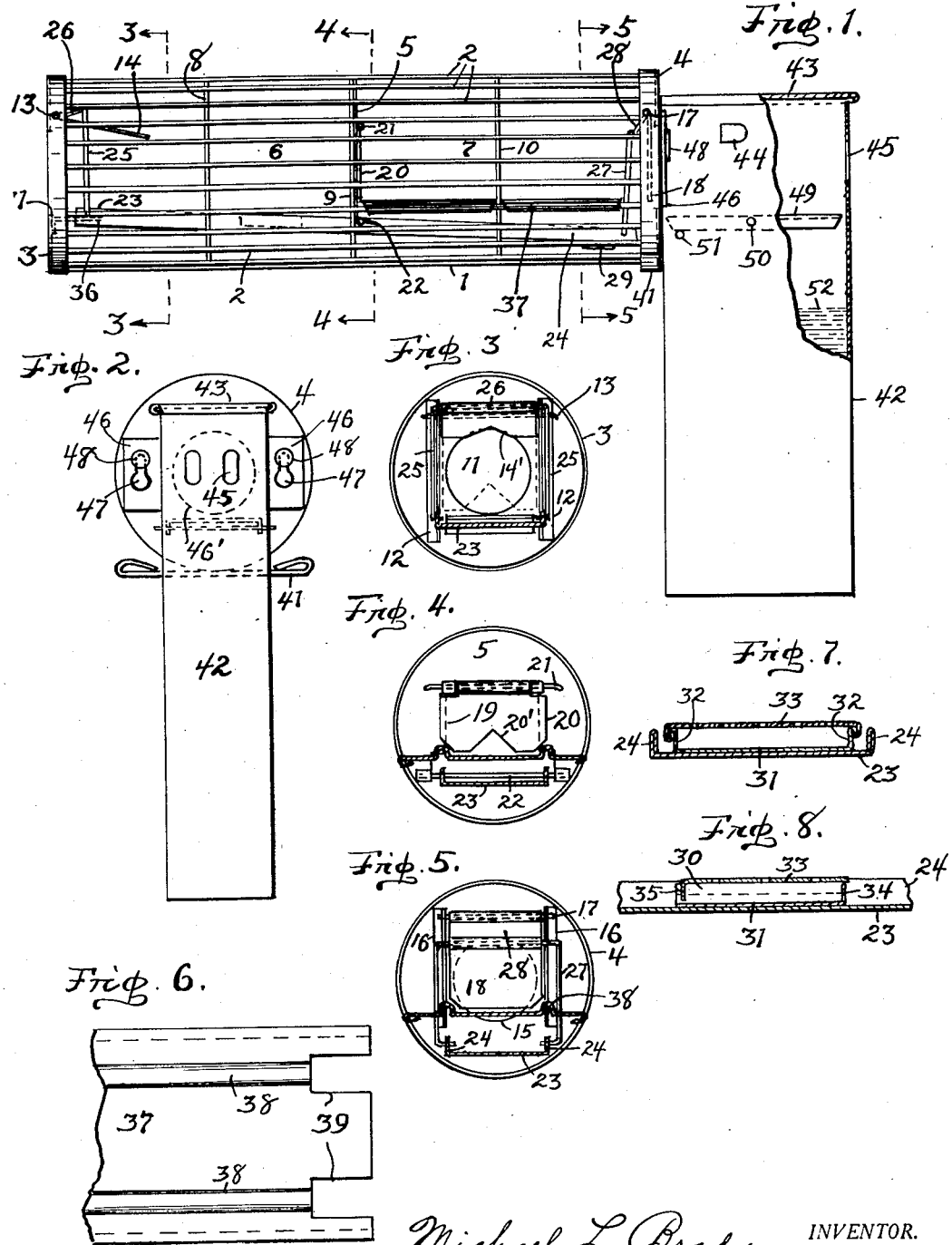
Michael L. Brady　INVENTOR.
BY
　　ATTORNEY.

Nov. 28, 1933.   M. L. BRADY   1,937,262
ANIMAL TRAP
Filed Jan. 3, 1933   2 Sheets-Sheet 2
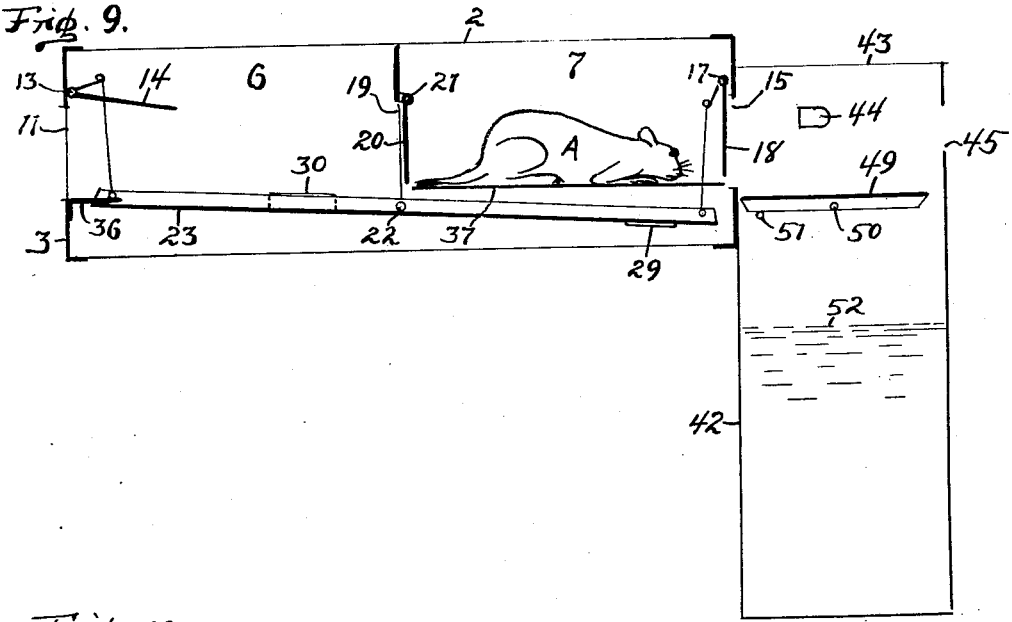
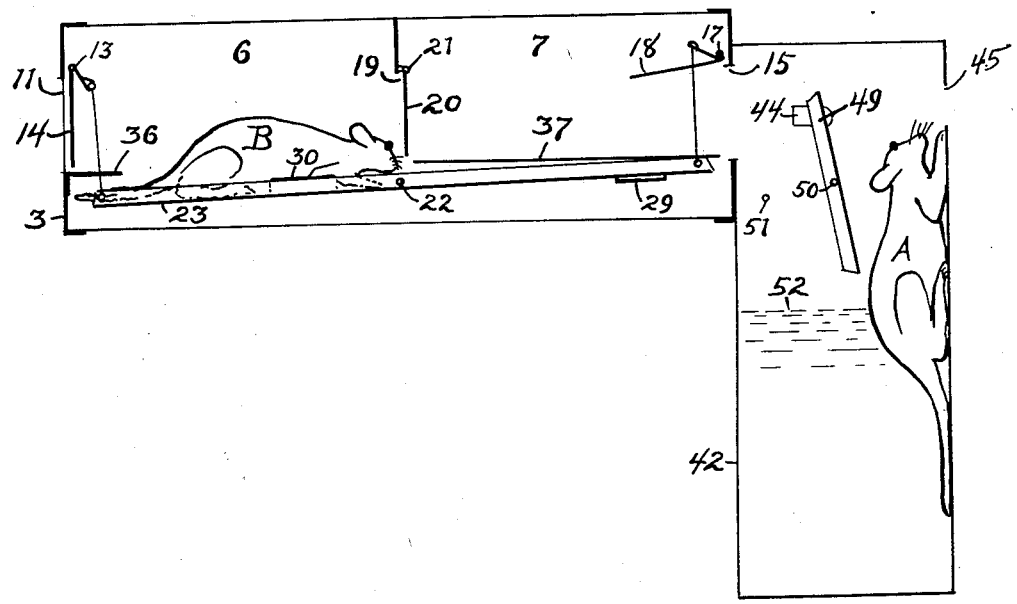
Michael L. Brady INVENTOR.
BY
A. G. Burns ATTORNEY.

Patented Nov. 28, 1933

1,937,262

UNITED STATES PATENT OFFICE 1,937,262

ANIMAL TRAP

Michael L. Brady, Elwood, Ind.

Application January 3, 1933. Serial No. 649,814

3 Claims. (Cl. 43—69)

This invention relates to improvements in animal traps of the automatically operated type. One of the objects of the invention is to provide an efficient trap constructed for continuous operation without requiring to be reset. A further object is to afford a trap so constituted that in its operation an entrapped animal is utilized as a lure for others, and which does not require frequent rebaiting. Other objects and advantages of the invention will appear in the following description.

An illustrative embodiment of the invention is shown in the accompanying drawings, in which:—

Fig. 1 is a side elevation of a structure embodying the invention, a portion being broken away;

Fig. 2 is a rear elevation of the structure shown in Fig. 1;

Fig. 3 is a transverse section of Fig. 1 on the line 3—3 thereof;

Fig. 4 is a transverse section of Fig. 1 on the line 4—4 thereof;

Fig. 5 is a transverse section of Fig. 1 on the line 5—5 thereof;

Fig. 6 is a fragmentary plan view of a tilting runway forming part of the invention;

Fig. 7 is a transverse section of the runway and bait-box therein;

Fig. 8 is a longitudinal section of the bait box and adjacent portion of the runway;

Fig. 9 is a diagrammatical view of the trap with the movable parts disposed in their respective positions as assumed upon entrance of a captive into the second compartment thereof; and Fig. 10 is another diagrammatical view with the movable parts disposed as upon entrance of a second captive into the first compartment and release of the first-mentioned captive from the second compartment into an adjoining pitfall.

Figs. 6, 7, and 8 are drawn to a larger scale than the other figures.

The illustrative embodiment of the invention consists of a cylindrical cage 1 formed of an annular series of rods 2 longitudinally disposed and spaced apart, the ends of which are secured in heads 3 and 4 that form the corresponding ends of the cage. Also, a partition 5 disposed vertically and transversely is arranged in the cage whereby said cage is divided into two axially alined compartments 6 and 7. The rods 2 are further supported at points intermediate the heads 3 and 4 by a suitable number of hoops 8, 9 and 10 which are secured to the rods in any convenient manner. The purpose of the hoops is to prevent the rods from being forced apart or outwardly by captives while seeking escape between the cage bars.

The front head 3 has a central ingress opening 11 made therein, and upon the inner face of said head adjacent each side of the opening is a vertically disposed angle bar 12. A pintle 13 is disposed horizontally in said bars near the tops thereof above the ingress opening 11, and upon which is hingedly supported a pendent ingress door 14 disposed to obstruct the opening 11 in the head 3 when in closed position, and have inward swinging movement as hereinafter described.

The rear head 4 has a central egress opening 15 made therein, and upon the inner face of said head adjacent each side of the opening is a vertically disposed angle-bar 16. A pintle 17 is disposed horizontally in said bars near the tops thereof, above the egress opening 15, and upon which is hingedly supported a pendent egress door 18 disposed to obstruct the opening 15 in the head 4 when in closed position, and have inward swinging movement as hereinafter referred to.

The partition 5 has therein an egress opening 19 normally obstructed by a flap door 20 that is dependently supported upon a pintle 21 secured in connection with the partition at a point above said opening so that said flap door has free swinging movement inwardly with respect to the compartment 7 and is limited in its return swinging movement by contact of its sides with the rear face of the partition.

A horizontal fulcrum shaft 22 is secured in connection with the lower end of the partition 5 and upon which is mounted a runway 23 that has tilting movement thereon. The runway is preferably formed of a metal plate provided with upwardly extending side flanges 24. The forward end of the runway is operatively associated with the ingress door 14 by means of a stirrup 25 which is connected at its top with a wing 26 on said door while the lower extremities of the stirrup are pivotedly connected in the corresponding flanges 24 at points adjacent the front end of the runway. By this arrangement when the forward end of the runway is elevated, the ingress door 14 is automatically raised to open position and when the same end of the runway is lowered said door is automatically closed and the ingress opening thereby obstructed. The rear end of the runway is likewise operatively associated with the egress door 18 by means of a stirrup 27 which is connected at its top with a wing 28 on said door while the lower extremities of said stirrup are pivotedly connected in the corresponding flanges 24 at points adjacent the front end of the runway. Thus, as the rear end of the runway is lowered the door 18 is automatically closed so as to obstruct the egress opening 15 in the head 4 of the cage, and when the same end of the runway is elevated the door 18 is thereupon automatically moved to its open position. The swinging movements of the doors 14 and 18 occur simultaneously in opposite directions.

A weight 29 is attached to the bottom of the runway at a point near the rear end thereof which is of such size that the runway is normally sustained in a declining position toward its rear end so that when the cage is unoccupied the ingress door 14 is normally held open while the egress door 18 is held closed.

Upon the front portion of the runway 23 is located a bait box 30 of any suitable construction. Preferably, the bait box is formed of a plate 31 with side flanges 32 the upper edges of which are down-turned over their exterior faces. A perforated cover 33 forms the top of the bait box, its sides having flanges formed to loosely interlock the corresponding down-turned upper edges of the flanges 32 so as to permit only longitudinal sliding movement of the cover thereon. The rear end 34 of the plate 31 is bent upwardly to form the corresponding end of the box, and the front end of the cover 35 is bent downwardly to form the front end of the box. By sliding the cover toward the front end of the runway, bait may be introduced into the box and subsequently confined therein by sliding the cover back to its closed position. By this arrangement the aroma of the bait exudes through the perforated cover so that the quarry is attracted thereby while the body of the belt being inaccessible is conserved.

To the inner face of the head 3, at the level of the bottom of the ingress opening 11 therein, is secured a threshold 36 that projects horizontally into the compartment 6 and overhangs the front end of the runway 23, and within the compartment 7 is disposed a stationary horizontal platform that overhangs the runway and extends in a plane slightly beneath the lower ends of the doors 18 and 20 so as not to interfere with the movements of said doors or the runway, there being longitudinal channels 38 made in said platform located so as to accommodate the flanges 24 on the runway when the rear end thereof is raised. The platform 37 also has made in its rear end gains 39 alined respectively with the channels 38 through which the lower extremities of the stirrup 27 have free play.

Preferably, the doors 14 and 20 have formed in their lower ends corresponding V-shaped notches 14' and 20' to provide sight openings when the doors are in closed position and also to augment the effectiveness of each door as a catch in preventing retreat of the quarry after passing partway therebeneath.

Preferably, a horizontal base 41 is secured to the bottom of the head 4 so that when the cage is positioned upon a suitable support (not shown) lateral rocking of the cage is thereby prevented.

A pitfall is arranged removably in connection with the cage which consists of a box 42 having a removable cover 43 and is provided with peep-holes 44 and 45 in its vertical walls at points adjacent its upper end and also an opening 46' that registers with the exit opening 15 in the head 4. The box has lateral brackets 46 provided with openings 47 therein for the reception of corresponding button-headed studs 48 that project from the outer face of said head, the openings being so shaped as to permit ready attachment and removal of the box from its connection with the cage. The box has also therein a platform 49 disposed upon a fulcrum 50 and is normally balanced thereon in horizontal position. A transverse rod 51 extends beneath the forward end of the platform whereby downward movement of the corresponding end of the platform beyond its horizontal position is prevented.

In use, a suitable aromatic bait is deposited in the bait box 30, the box 42 is partially filled with liquid 52 and the apparatus is positioned at a suitable point of vantage. When a rodent A, attracted by the bait, enters through the ingress opening 11 into the compartment 6 it is supported assuringly by the threshold 36 while the door 14 is held open. As the entering rodent A progresses onto the forward end of the runway 23, thereby causing the runway to tilt, the door 14 automatically closes downwardly upon its back, and in the event retreat is undertaken it becomes wedged in the notched lower end of the door. When thus foiled the rodent A draws himself from beneath the door into the compartment 6 from which it escapes through the flap door 20 onto the platform 37 into the compartment 7 (Fig. 9). As the forward end of the runway is thus relieved of the weight of the rodent the runway assumes its former position causing the door 18 to close and the door 14 to re-open, whereupon, the rodent is entrapped within the compartment 7 between the doors 18 and 20. The natural subsequent attempt of the entrapped rodent to escape causes more or less commotion and arouses curiosity of others. When another rodent B enters the compartment 6 in a similar manner the runway is again tilted causing the door 14 to close and the door 18 to open, whereupon, the rodent A, previously entrapped, escapes from the compartment 7 through the exit opening 15 onto the tilting platform 49, and the rodent B at leisure enters the compartment 7, relieving the runway of its weight so that the door 18 is again closed and the rodent B is entrapped in the same manner as its predecessor. The first rodent A in maneuvering to escape through the peep holes 45 causes the platform 49 to tilt, and upon exhaustion drops into the pitfall and is drowned in the liquid.

The second rodent B in the meantime is held captive in the compartment 7 until released by entrance into the compartment 6 of another victim, and upon its release from the compartment 7 enters the pitfall as in the case of the first rodent A.

By thus constructing the trap, operation thereof is automatic and continuous, it being only necessary to occasionally remove the pitfall and empty its contents and renew the bait when it becomes ineffective.

I claim:

1. A trap consisting of a cage having at one end a head provided with an ingress opening and a pivoted inwardly swinging door, and having at its opposite end a head provided with an egress opening and a pivoted inwardly swinging door, a tilting runway in the cage and having a complemental supporting fulcrum, the ends of which runway are operatively associated correspondingly with said doors whereby opening of one of said doors is accompanied by the closing of the other door, and vice-versa, an apertured partition dividing said cage into two axially alined compartments and provided with a flap door arranged to have free swinging movement toward said egress opening, a platform disposed within the compartment adjacent the egress opening disposed in a plane above the runway, a stationary threshold secured to the front head of the cage and extending into the adjacent compartment and overlapping the forward end of the runway, a pitfall removably secured to the rear head of the cage and having communication with the rear compartment thereof through the egress opening, and a tilting platform held normally in horizontal position in said pitfall.

2. A trap consisting of a cage having two alined compartments, one of which compartments has an ingress opening and an inwardly swinging door therefor, the other compartment having an egress opening and a inwardly swinging door therefor, a partition between said compartment having an opening and a flap door therefor adapted to swing freely toward said egress opening, a platform disposed within the cage between said partition and the egress end of said cage, said runway having connections at its opposite ends respectively with said ingress and egress doors so arranged that upon tilting of the runway, one of said doors is closed and the other opened accordingly as the runway is actuated, a pitfall in communication with the cage through the exit opening thereof, and a tilting platform located in the pitfall in a plane adjacent the lower end of the egress opening.

3. A trap consisting of a cage having two alined compartments, one of which compartments has an ingress opening and an inwardly swinging door therefor, the other compartment having an egress opening and an inwardly swinging door therefor, a partition between said compartment having an opening and a flap door therefor adapted to swing freely toward said egress opening, a platform disposed within the cage between said partition and the egress end of said cage, said runway having connections at its opposite ends respectively with said ingress and egress doors so arranged that upon tilting of the runway, one of said doors is closed and the other opened accordingly as the runway is actuated, and a pitfall having communication with the cage through the exit opening thereof.

MICHAEL L. BRADY.